(12) United States Patent
Daudelin

(10) Patent No.: US 8,786,461 B1
(45) Date of Patent: Jul. 22, 2014

(54) ELECTRIC ROAD FLARE

(71) Applicant: Steven Daudelin, Pembroke, MA (US)

(72) Inventor: Steven Daudelin, Pembroke, MA (US)

( * ) Notice: Subject to any disclaimer, the term of this patent is extended or adjusted under 35 U.S.C. 154(b) by 0 days.

(21) Appl. No.: 13/759,673

(22) Filed: Feb. 5, 2013

(51) Int. Cl.
| | |
|---|---|
| *G08B 5/22* | (2006.01) |
| *G08B 5/00* | (2006.01) |
| *G08B 5/36* | (2006.01) |
| *F21L 4/00* | (2006.01) |
| *F21V 33/00* | (2006.01) |
| *B65D 85/38* | (2006.01) |

(52) U.S. Cl.
USPC .............. 340/815.45; 340/815.4; 340/815.49; 382/183; 382/155; 382/154; 382/190; 206/316.1

(58) Field of Classification Search
None
See application file for complete search history.

(56) References Cited

U.S. PATENT DOCUMENTS

| | | |
|---|---|---|
| 3,875,561 A | 4/1975 | Scarpino et al. |
| 4,345,305 A | 8/1982 | Kolm et al. |
| 4,374,376 A | 2/1983 | Pillifant, Jr. |
| 4,827,245 A | 5/1989 | Lipman |
| 4,875,028 A | 10/1989 | Chou |
| 5,046,639 A | 9/1991 | Deberry |
| 5,097,612 A | 3/1992 | Williams |
| 5,103,383 A | 4/1992 | Mayhew |
| 5,149,190 A | 9/1992 | MacKenzie |
| 5,294,924 A | 3/1994 | Dydzyk |
| 5,419,065 A | 5/1995 | Lin |
| 5,608,290 A | 3/1997 | Hutchisson et al. |
| 5,685,631 A | 11/1997 | Dobert et al. |
| 5,785,410 A | 7/1998 | Branson, Sr. |
| 5,806,965 A | 9/1998 | Deese |
| 6,206,541 B1 | 3/2001 | Landamia |
| 6,265,969 B1 | 7/2001 | Shih |
| 6,394,522 B1 | 5/2002 | Ingoldt |
| 6,543,911 B1 | 4/2003 | Rizkin et al. |
| 6,549,121 B2 | 4/2003 | Povey et al. |
| 6,637,904 B2 | 10/2003 | Hernandez |
| 6,788,217 B2 | 9/2004 | Pederson |
| D498,164 S | 11/2004 | Delich |
| 6,899,441 B2 | 5/2005 | Chen |
| 7,088,222 B1 | 8/2006 | Dueker et al. |
| 7,106,179 B1 | 9/2006 | Dueker et al. |
| 7,111,958 B2 | 9/2006 | Coman |
| 7,182,479 B1 | 2/2007 | Flood et al. |
| 7,344,266 B2 | 3/2008 | Coman |
| D565,447 S | 4/2008 | Horng |
| D569,755 S | 5/2008 | Humble et al. |
| 7,782,223 B2 | 8/2010 | Lang et al. |
| 7,878,678 B1 | 2/2011 | Stamatatos et al. |
| 2002/0121877 A1 | 9/2002 | Smith et al. |
| 2007/0291473 A1 | 12/2007 | Traynor |
| 2010/0117850 A1 | 5/2010 | McCaslin et al. |
| 2010/0259199 A1 | 10/2010 | McDermott |
| 2010/0321934 A1 | 12/2010 | McDermott |
| 2011/0043126 A1 | 2/2011 | McDermott |
| 2011/0058364 A1 | 3/2011 | McDermott |

*Primary Examiner* — Jennifer Mehmood
*Assistant Examiner* — Pameshanand Mahase
(74) *Attorney, Agent, or Firm* — John P. McGonagle

(57) ABSTRACT

A deployment pack containing a number of electric road flares is provided. The pack is attached to an emergency vehicle. The pack is adapted to deploy a single flare at a time. Each flare includes two, battery-operated, light emitting diodes (LEDs), pulsed at a predetermined rate. Each LED is placed adjacent reflective material to extend or direct the light pulsing from the LED. The pack provides battery charging means to each electric road flare while contained in the pack interior. The pack also provides means for activating each flare before it is deployed from the pack. Each flare contains two metallic roads providing means for flare retrieval by a magnetic pick-up tool.

6 Claims, 6 Drawing Sheets

ELECTRIC ROAD FLARE

CROSS-REFERENCE TO RELATED APPLICATIONS

Applicant claims the priority benefits of U.S. provisional Patent Application No. 61/595,377, filed Feb. 6, 2012.

BACKGROUND OF THE INVENTION

This invention relates to lighting devices, and in particular, to safety lighting devices for providing a warning or alert to persons or vehicles within the vicinity of the lighting device.

At an incident, such as a traffic accident, an individual usually distributes a plurality of road flares on the road as a temporary divider or warning on a roadway. The road flares alert other drivers that there is an accident or other incident in front so as to separate the accident/incident from the roadway. One of the most common road flares is the ignition type disposable flare wherein the flare is simply ignited and directly disposed on the roadway. However, conventional ignition type flares have several drawbacks. Such flares are a fire hazard, not to mention a hazard to the individuals using them. Once a flare has been ignited, it is not safe for an individual to move or relocate it. The individual could burn their clothes, or their skin, or injure others. Moreover, combustible flares could ignite spilt fuel or dry brush along a roadside. Moreover, the usable time of the flare depends on the burning rate of the flare. If the user finishes the need for the flare before the flare is used up, the flare must be left on the roadway until the flare is totally burnt. If the user requires longer time for emergency lighting, another flare must be ignited.

Accordingly, there remains a need for a visual signal device that will operate to not only aid emergency personnel to locate an emergency site, but to provide a warning of an emergency condition. Moreover, it is desirable that the signal device be durable, environmentally safe, available at a reasonable cost and compact in size and operate to unequivocally signal an emergency condition. Furthermore, the signal device must have the capability to be easily turned on and off.

SUMMARY OF THE INVENTION

The present invention solves some of the aforementioned problems by providing an emergency signaling device that is simple in construction yet durable and safe to use. Another object of the present invention is to provide an emergency signaling device that is reliable, easily deployed, easily recovered after use, is water resistant, and easily turned on and off. Features of the present invention include the use of a battery-operated light emitting diodes pulsed at a predetermined rate, said diodes being placed adjacent reflective material to extend or direct the light pulsing from the diodes. The emergency signaling device includes metallic bars to assist in magnetic recovery of the devices after use.

The present invention also includes a deployment pack attached to an emergency vehicle, said pack holding a number of emergency signaling devices and adapted to deploy said devices quickly and efficiently. The deployment pack allows a person to deploy illumination devices without being exposed to dangerous conditions. The user may then deploy the illumination devices to mark the road without being subjected to the dangers of oncoming traffic.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
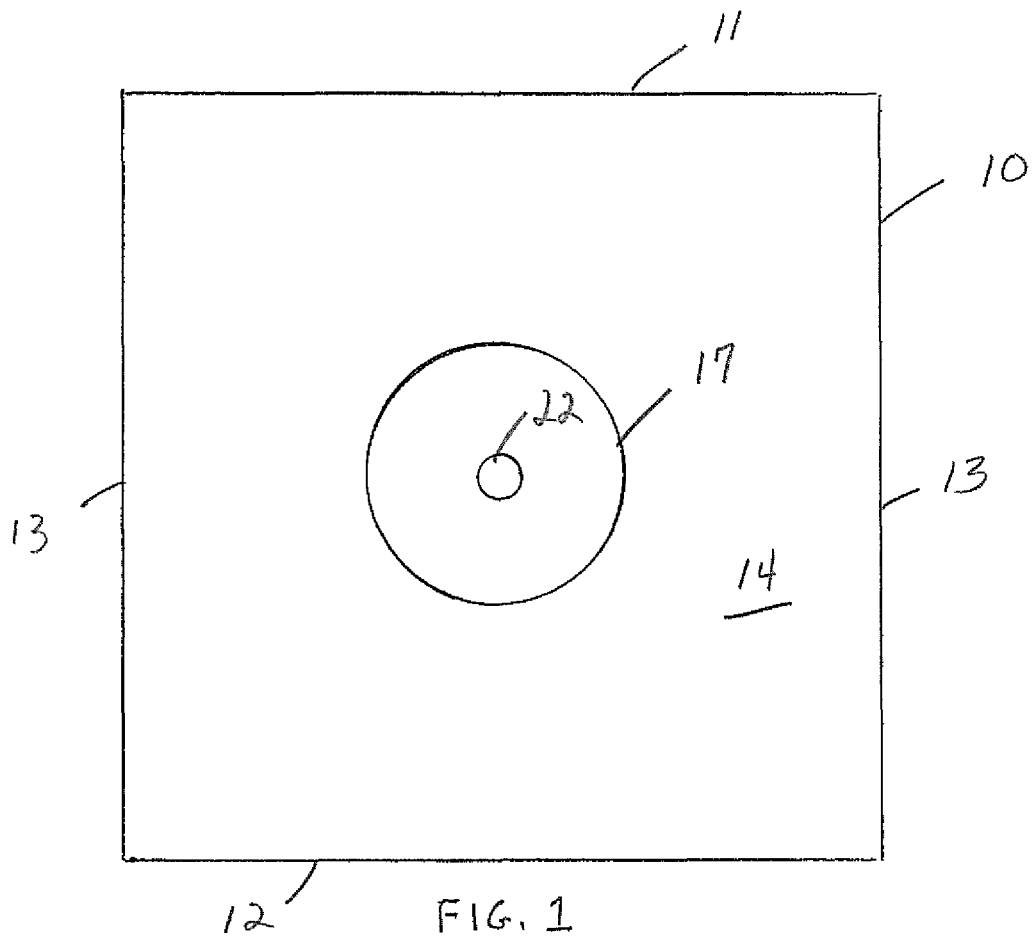
FIG. 1 is an upper surface view of an electric road flare.
Figure 2:
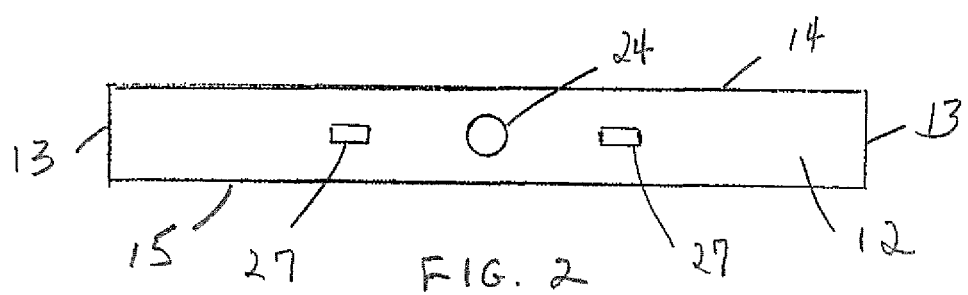
FIG. 2 is a bottom edge view of the electric road flare.
Figure 4:
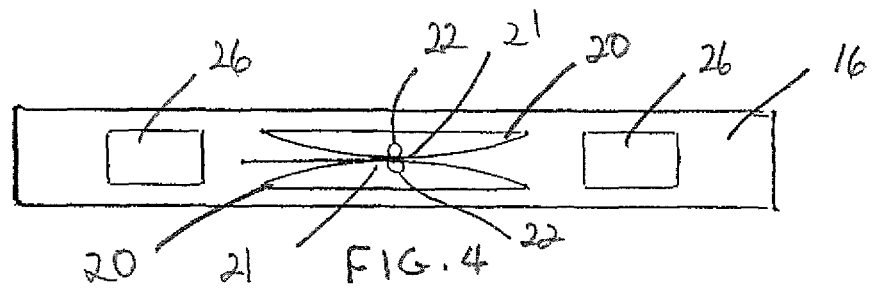
FIG. 4 is a cross sectional view along the line 4-4 of FIG. 3.
Figure 3:
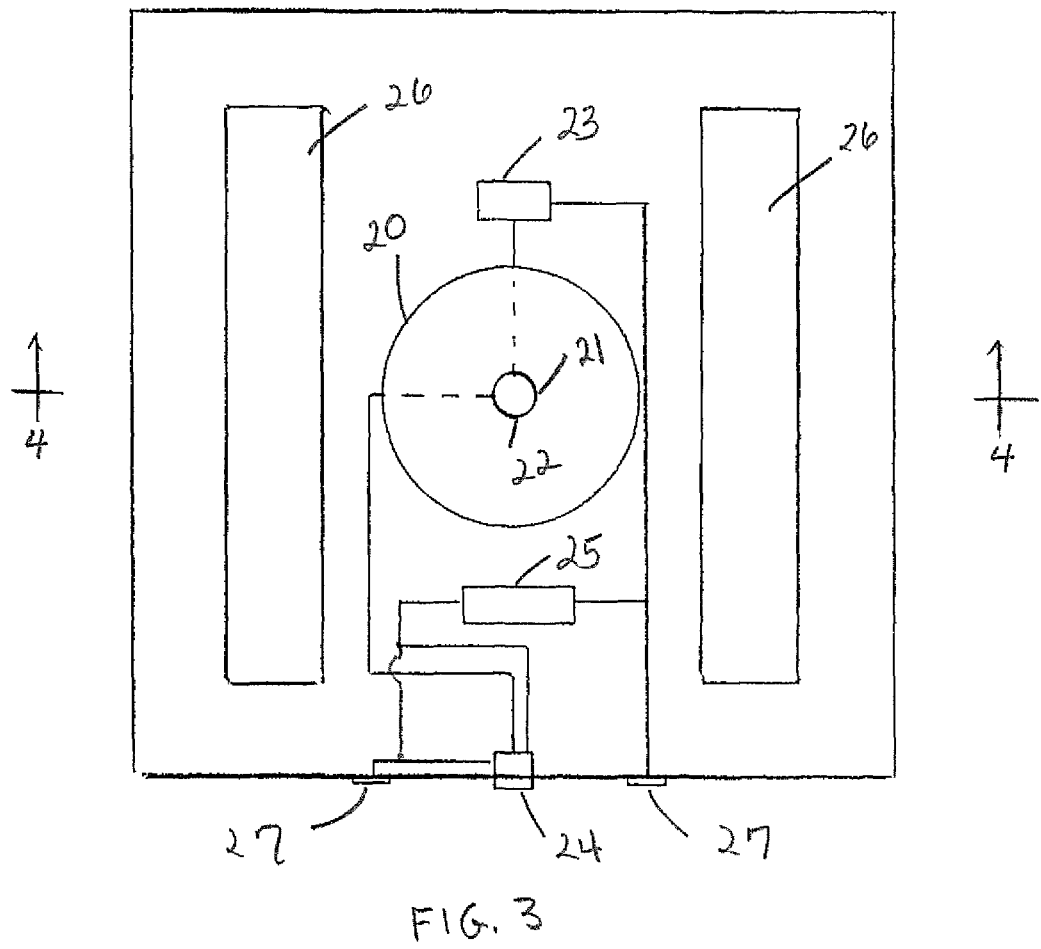
FIG. 3 is an upper surface plan view of the electric road flare.
Figure 5:
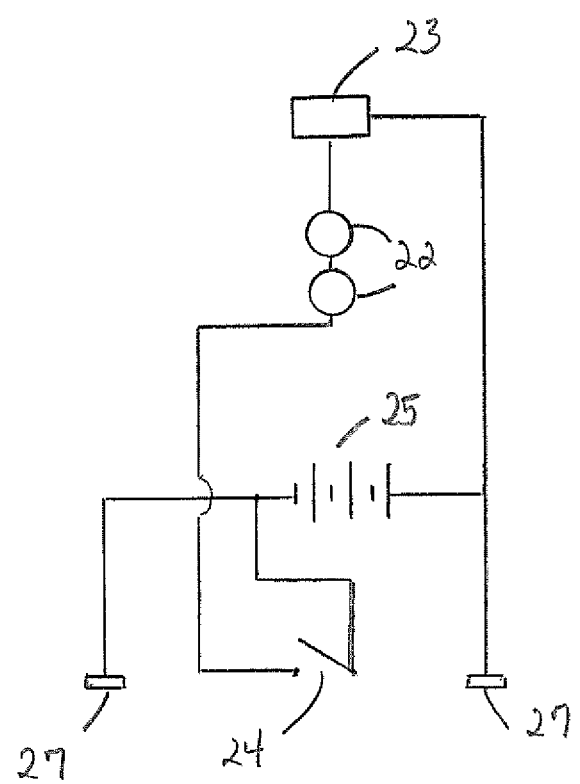
FIG. 5 is an electrical diagram of the electric road flare.
Figure 6:
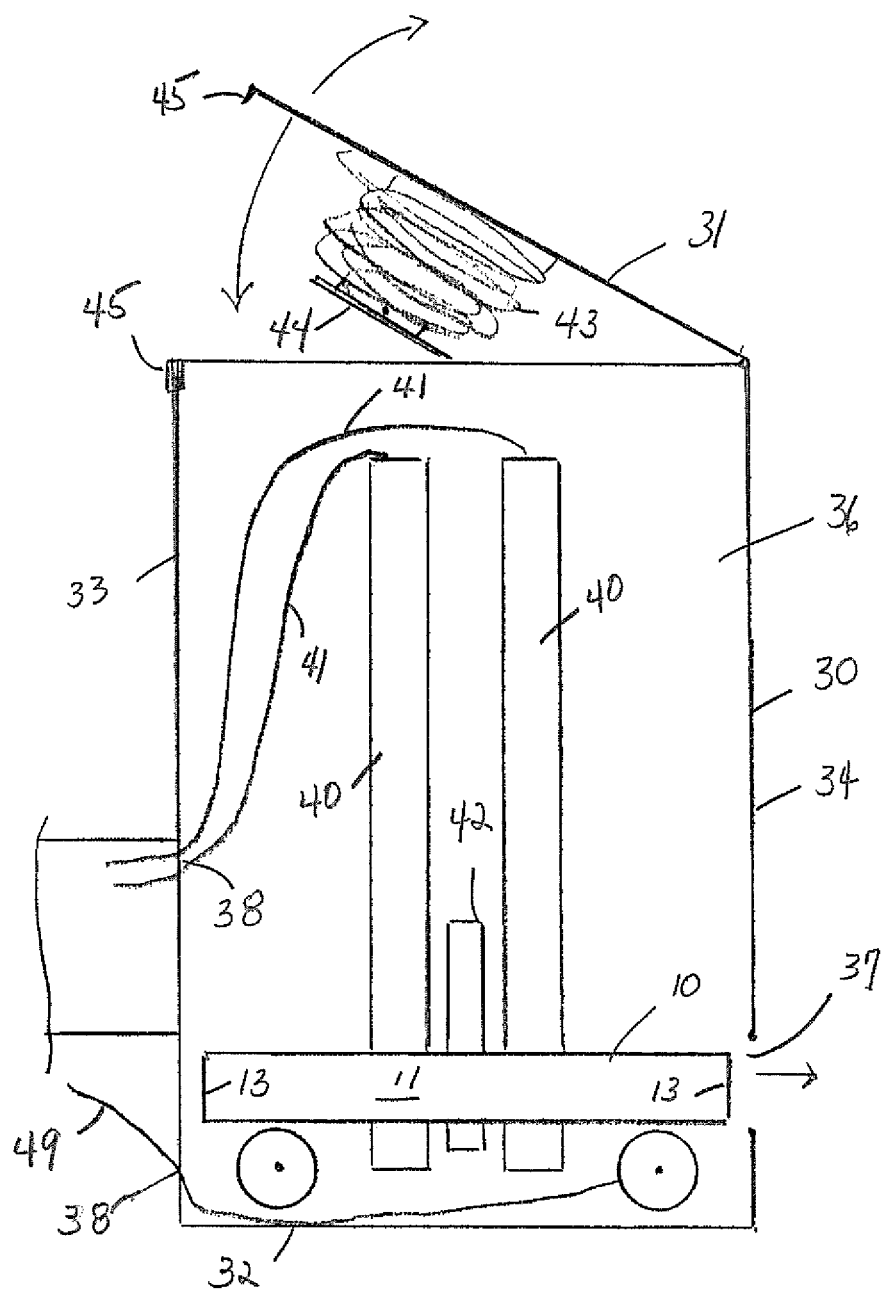
FIG. 6 is a side plan view, partially exploded, of an electric road flare case.
Figure 7:
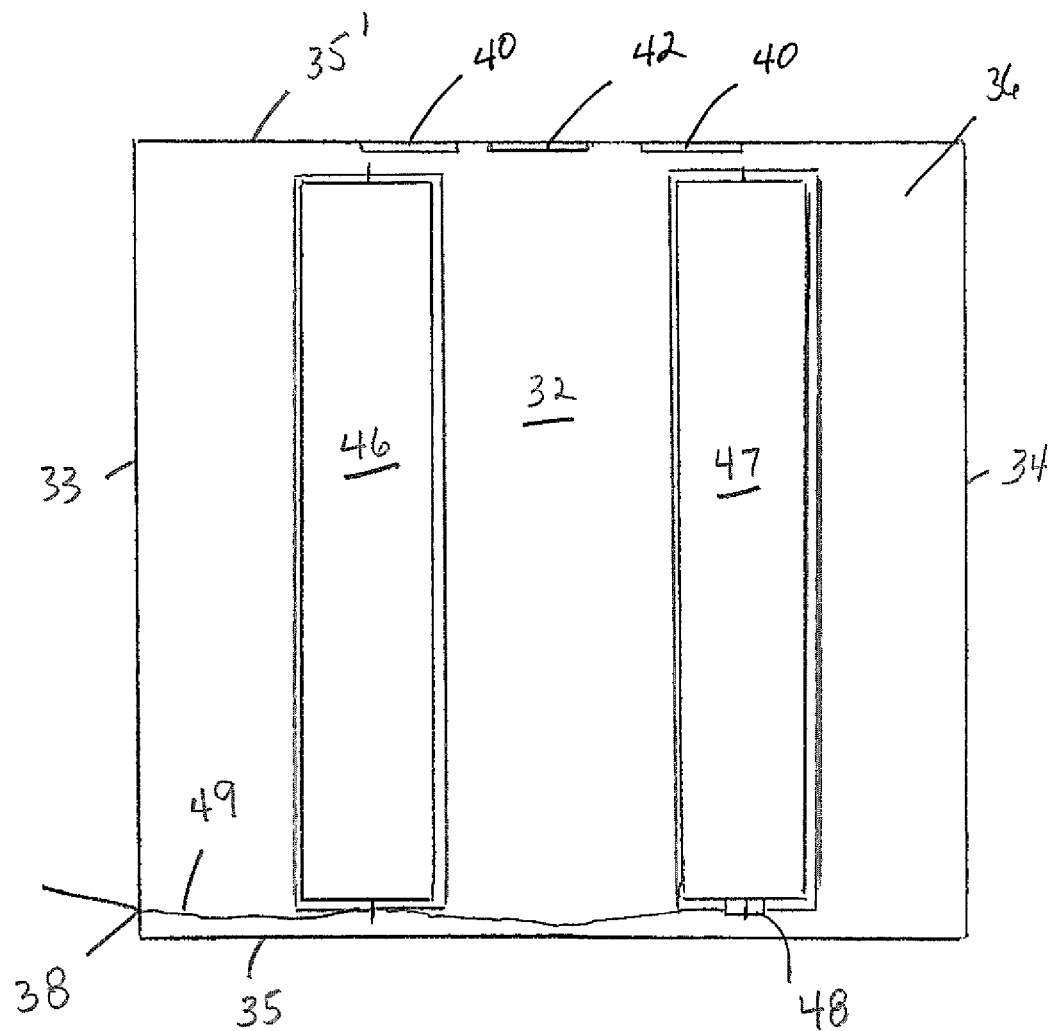
FIG. 7 is a bottom view of the electric road flare case.
Figure 8:
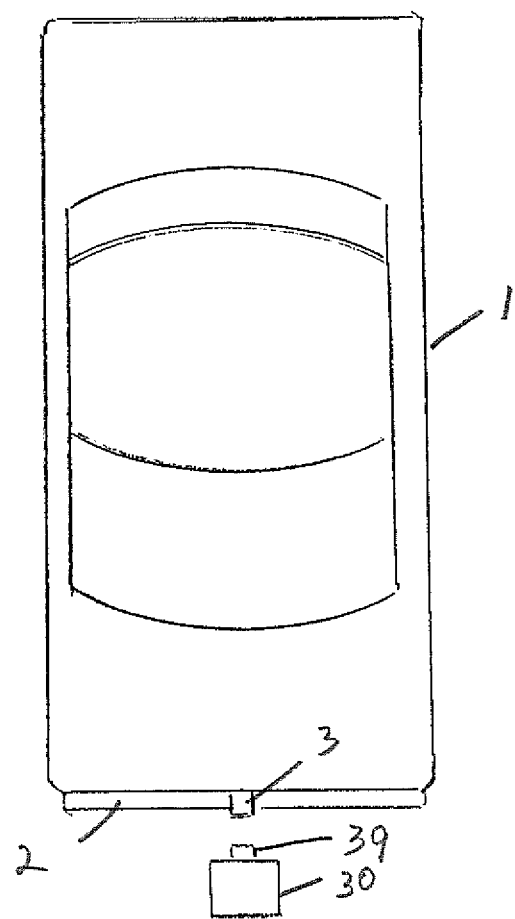
FIG. 8 is diagrammic view of the electric road flare case positioned for mounting on an emergency vehicle.

Referring to the drawings in detail wherein like elements are indicated by like numerals, there is shown an electric road flare 10 according to the principles of the present invention. The flare 10 is generally rectangular and has a top edge 11, bottom edge 12, two opposite side edges 13, an upper planar surface 14, and an opposite under planar surface 15, said edges and surfaces defining a flare interior 16. The upper and under surfaces 14, 15 each have an annular central transparent area 17. The flare 10 is generally flat having a uniform thickness between upper and under surfaces of approximately 0.5 inches.

The flare interior 16 contains two generally annular, concave reflectors 20, centrally located, each reflector 20 opening onto a said surface central transparent area 17. Each reflector 20 has a light emitting diode (LED) 22 positioned at the reflector vertex 21. The LEDs 22 are electrically connected to a flasher circuit 23 which pulses the LEDs at a predetermined rate. The LEDs 22 and flasher circuit 23 are electrically connected through a switch 24 to a rechargeable battery 25. The battery 25 also has two leads connected to two external metal elements 27 attached externally to the flare bottom edge 12. The external metal elements 27 provide means for externally charging the battery 25.

The flare interior 16 also contains two parallel, metallic rods metal rods 26, parallel to and near to said flare opposite side edges 13. The metallic rods 26 provide means for flare retrieval by a magnetic pick-up tool (not shown), such as sold under the AMK Manufacturing Roadmag brand. These magnetic pick-up tools are typically suspended beneath a clean-up vehicle, such as a highway department truck, used after accidents wherein the suspended magnet picks up nails, wire and other metal objects that can damage tires or injure people. The capability of magnetically recovering the present invention flare is unique to the present invention.

The present invention also provides a case 30 for holding a plurality of electric road flares 10. The case 30 is a generally rectangular with a pivotal, lid top 31, a bottom 32, a rear side 33, a front side 34, two opposite sides 35 interconnecting said front and rear sides, said top, bottom and sides defining a case interior 36. The case front side 34 has a generally rectangular aperture 37 formed therein, said front aperture extending from opposite side to opposite side, near to the bottom 32 toward the top 31 a predetermined distance. The case interior 36 has two parallel conductive strips 40 along one of said opposite sides 35', extending from near the case bottom 32 toward the case top 31, each of said conductive strips having an electrical lead 41 attached thereto and extending through an aperture 38 in the case rear side 33. The case interior 36 also has a switch activation strip 42 along the same side 35' as the conductive strips 40, said switch activation strip 42 being located between said conductive strips 40 and extending from near said case bottom 32 a predetermined distance toward the case top 31.

The case pivotal top 31 has a spring 43 attached thereto, said spring extending downward into the case interior 36. The spring terminates in a flat element flat element 44. The case top has a latch mechanism 45 to hold the top lid in closed position. The case interior 36 two, elongated parallel rotating elements 46, 47 contained therein. The rotating elements each have a longitudinal axis extending from case side 35 to case side 35', each said rotating element longitudinal axis being parallel to the case front and rear sides. The rotating element 46 nearest the case rear 33, is free wheeling. The rotating element 47 nearest the case front 34 has an electrical drive element 48 electrically connected by a lead 49 interconnected through the case rear 33 to the emergency vehicle 1 described below. The case 30 is adapted to hold a plurality of electric road flares 10 resting on said rotating elements 46, 47 and held in position by the lid flat element 44. The electric road flare 10 at the bottom of the stacked flares is adjacent the front side aperture 37.

The case rear 33 has a hitch attachment element 39 fixedly attached thereto, said hitch attachment element adapted to removably attach said case 30 to the tow hitch 3 on the rear end 2 of an emergency vehicle 1 such as a police cruiser. The electrical leads 41, and 49 from the case attach to the battery of the emergency vehicle.

In operation, the case interior 36 is loaded with a plurality of flares 10. The case 30 is attached to the emergency vehicle hitch 3. Each flare is positioned in the case interior 36 so that a flare bottom edge 12 is positioned against the case opposite side 35' with the conductive strips 40, wherein the flare bottom edge metal elements 27 are electrically engaged with the conductive strips 40. The flare switch 24 is set to the off position so that the flare LEDs 22 and flasher 23 are inactive. However, the flare battery 25 is in a charging mode from electricity from the emergency vehicle batter through the electrical leads 41 and conductive strips. When the emergency vehicle arrives at an emergency site, the drive roller 47 at the bottom of the case is activated sliding the bottom most flare 10 out through the front aperture 37 onto the emergency site. As each flare moves downward, the switch activation strip 42 activates the flare switch 24 before the flare is ejected from the case.

It is understood that the above-described embodiment is merely illustrative of the application. Other embodiments may be readily devised by those skilled in the art which will embody the principles of the invention and fall within the spirit and scope thereof.

I claim:

1. An electric road flare kit, comprising:
   a plurality of electric road flares, each flare comprising:
   a top edge, a bottom edge, two opposite side edges, an upper planar surface, and an opposite under planar surface, said edges and surfaces defining a flare interior, wherein said upper and under surfaces each have an annular central transparent area;
   wherein said flare interior contains two generally annular, concave reflectors, centrally located, each reflector opening onto a said surface central transparent area;
   wherein each said reflector has a light emitting diode (LED) positioned at a reflector vertex;
   wherein said LEDs are electrically connected to a flasher circuit within said flare interior, said flasher circuit adapted to pulse the LEDs at a predetermined rate, said LEDs and flasher circuit being electrically connected through a switch at the flare bottom edge to a rechargeable battery located within said flare interior;
   wherein the battery also has two leads connected to two external metal elements attached externally to the flare bottom edge, said external metal elements providing means for externally charging the battery;
   wherein the flare interior also contains two parallel, metallic rods, parallel to and near to said flare opposite side edges, said metallic rods provide means for flare retrieval by a magnetic pick-up tool;
   a case for holding said plurality of electric road flares, said case being generally rectangular with a pivotal, lid top, a bottom, a rear side, a front side, two opposite sides interconnecting said front and rear sides, said top, bottom and sides defining a case interior, said case front side having a generally rectangular aperture formed therein, said front aperture extending from opposite side to opposite side, near to the bottom toward the top a predetermined distance;
   wherein said case interior has two parallel conductive strips along one of said opposite sides, extending from near the case bottom toward the case top, each of said conductive strips having an electrical lead attached thereto and extending through an aperture in the case rear side;
   wherein said case interior has a switch activation strip along the same side as the conductive strips, said switch activation strip being located between said conductive strips and extending from near said case bottom a predetermined distance toward the case top;
   wherein the case pivotal top has a spring attached thereto, said spring extending downward into the case interior; said spring terminating in a flat element flat element, said case top having a latch mechanism to hold the top lid in closed position;
   wherein said case interior has two, elongated parallel rotating elements contained therein near to the case bottom, said rotating elements each having a longitudinal axis extending from case side to case side, each said rotating element longitudinal axis being parallel to the case front and rear sides;
   wherein said case is adapted to hold a plurality of electric road flares within the case interior resting on said rotating elements and held in position by the lid flat element, wherein an electric road flare at a bottom of the stacked flares is adjacent the front side aperture.

2. An electric road flare kit as recited in claim 1, wherein:
the case rear has a hitch attachment element fixedly attached thereto, said hitch attachment element adapted to attach said case to a tow hitch on a rear end of an emergency vehicle;
the electrical leads from the case attach to a battery in the emergency vehicle.

3. An electric road flare kit as recited in claim 2, wherein:
each flare has a generally rectangular shape and is generally flat having a uniform thickness between upper and under surfaces.

4. An electric road flare kit as recited in claim 3, wherein:
the rotating element nearest the case rear is free wheeling; and the rotating element nearest the case front has an electrical drive element electrically connected by a lead interconnected through the case rear to said emergency vehicle.

5. An electric road flare kit as recited in claim 4, wherein:
each flare is positioned in the case interior so that a flare bottom edge is positioned against the case opposite side with the conductive strips, wherein the flare bottom edge metal elements are electrically engaged with the conductive strips, wherein each flare battery receives a charge from the emergency vehicle battery through the electrical leads and conductive strips.

6. An electric road flare kit as recited in claim 5, wherein:
the rotating element with the electrical drive element is adapted to sliding a bottom most flare out through the case front aperture onto an emergency site;
wherein the switch activation strip is adapted to activating a flare switch before a flare is ejected from the case.

\* \* \* \* \*